(12) United States Patent
Kim

(10) Patent No.: US 9,891,885 B2
(45) Date of Patent: Feb. 13, 2018

(54) FLYING DISPLAY DEVICE

(71) Applicant: SAMSUNG DISPLAY CO., LTD., Yongin-si (KR)

(72) Inventor: Beomshik Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/986,712

(22) Filed: Jan. 3, 2016

(65) Prior Publication Data

US 2016/0313743 A1   Oct. 27, 2016

(30) Foreign Application Priority Data

Apr. 24, 2015  (KR) .......................... 10-2015-0058207

(51) Int. Cl.
| | |
|---|---|
| *G06F 3/16* | (2006.01) |
| *G06F 3/01* | (2006.01) |
| *G06F 1/16* | (2006.01) |
| *G06F 3/03* | (2006.01) |
| *G05D 1/00* | (2006.01) |

(52) U.S. Cl.
CPC ........... *G06F 3/167* (2013.01); *G05D 1/0094* (2013.01); *G06F 1/1601* (2013.01); *G06F 3/012* (2013.01); *G06F 3/013* (2013.01); *G06F 3/017* (2013.01); *G06F 3/0304* (2013.01); *B64C 2201/00* (2013.01)

(58) Field of Classification Search
CPC .. G05D 1/0808; G05D 1/0016; G05D 1/0094; G06F 3/167; G06F 3/017; G06F 1/1613; G06F 3/0304; G06F 1/1601; G06F 3/012; G06F 3/013; B64C 2201/00
See application file for complete search history.

(56) References Cited

U.S. PATENT DOCUMENTS

| | | | | |
|---|---|---|---|---|
| 8,167,234 | B1* | 5/2012 | Moore | B64C 37/00 244/17.23 |
| 2014/0263822 | A1 | 9/2014 | Malveaux | |
| 2014/0304107 | A1 | 10/2014 | McAllister | |
| 2014/0313332 | A1 | 10/2014 | Sabe et al. | |
| 2014/0374535 | A1 | 12/2014 | Wong et al. | |
| 2016/0184719 | A1* | 6/2016 | D'Andrea | A63G 31/02 700/275 |
| 2016/0189101 | A1* | 6/2016 | Kantor | G08G 5/0013 705/338 |

\* cited by examiner

*Primary Examiner* — Mussa A Shaawat
*Assistant Examiner* — Michael Kerrigan
(74) *Attorney, Agent, or Firm* — Cantor Colburn LLP

(57) ABSTRACT

A display device includes a display unit, at least a flight unit connected to the display unit, a position information receiving unit obtaining information on a current position of the display device, a sensor unit obtaining information of a user, a flight control unit automatically controlling a flight of the display device, a posture information obtaining unit obtaining posture information of the display device, a main control unit controlling an overall operation of respective components of the display device, a posture correction unit varying an angle of the display device or the display unit, a vibration system, a voice recognition unit, a communication module, an input member transmitting input information to the communication module, a power source unit, an obstacle detection unit, a joint manipulator connecting the at least one flight unit and the display unit, and a connector connecting the display unit and the display device.

18 Claims, 4 Drawing Sheets

FLYING DISPLAY DEVICE

This application claims priority to Korean Patent Application No. 10-2015-0058207, filed on Apr. 24, 2015, and all the benefits accruing therefrom under 35 U.S.C. §119, the content of which in its entirety is incorporated herein by reference.

BACKGROUND

1. Field

Exemplary embodiments of the invention relate to a display device, and more particularly, to a flying display device.

2. Description of the Related Art

With the development of information technology in society, the prevalent use of display devices, as a connection medium between a user and information, is being witnessed. Due to the ease of slimming, display devices are used in a wide range of applications from household appliances such as televisions ("TV") or video cassette recorders ("VCR") to portable devices such as laptop computers or mobile phones.

SUMMARY

In general, display devices display an image on a fixed screen of a fixed-type liquid crystal display ("LCD") device. Thus, there is a limit in displaying an image by varying a position, an angle, and the like, of a display device as necessary.

Exemplary embodiments of embodiments of the invention are directed to a display device capable of changing an angle thereof based on a gaze of a user while moving along with the user by automatically tracking the user, without an additional operation performed by the user.

According to an exemplary embodiment of the invention, a display device includes a display unit, at least a flight unit connected to the display unit, a position information receiving unit obtaining information on a current position of the display device, a sensor unit obtaining information of a user, a flight control unit automatically controlling a flight of the display device, a posture information obtaining unit obtaining posture information of the display device, a main control unit controlling an overall operation of respective components of the display device, and a posture correction unit varying an angle of the display device or the display unit.

In an exemplary embodiment, the display device may further include a vibration system.

In an exemplary embodiment, the display device may further include a voice recognition unit recognizing a voice of the user and providing information of the recognized voice to the main control unit.

In an exemplary embodiment, the display device may further include a receiving input information and providing the received input information to the main control unit.

In an exemplary embodiment, the display device may further include an input member transmitting input information to the communication module.

In an exemplary embodiment, the display device may further include a power source unit.

In an exemplary embodiment, the display device may further include an obstacle detection unit.

In an exemplary embodiment, the display device may further include a joint manipulator connecting the flight unit and the display unit.

In an exemplary embodiment, the display device may further include the posture information obtaining unit includes at least one of a gyro sensor, a motion sensor, and an accelerometer sensor.

In an exemplary embodiment, the display device may further include a connector connecting the display unit and the display device.

In an exemplary embodiment, a piece of information of the user may include position information of the user.

In an exemplary embodiment, a piece of information of the user may include face information of the user.

In an exemplary embodiment, a piece of information of the user may include pupil information of the user.

In an exemplary embodiment, a piece of information of the user may include gesture information of the user.

In an exemplary embodiment, the position information receiving unit may include a global positioning system ("GPS") receiver.

In an exemplary embodiment, the position information receiving unit may include an inertial measurement unit ("IMU").

In an exemplary embodiment, the position information receiving unit may include a Wi-Fi-based poisitioning system ("WPS").

In an exemplary embodiment, the input member may be a smart device.

In an exemplary embodiment, the foregoing is illustrative only and is not intended to be in any way limiting. In addition to the illustrative exemplary embodiments, and features described above, further exemplary embodiments, and features will become apparent by reference to the drawings and the following detailed description.

BRIEF DESCRIPTION OF THE DRAWINGS

The above and other features and exemplary embodiments of the invention of invention will be more clearly understood from the following detailed description taken in conjunction with the accompanying drawings, in which.

DETAILED DESCRIPTION

Figure 1:
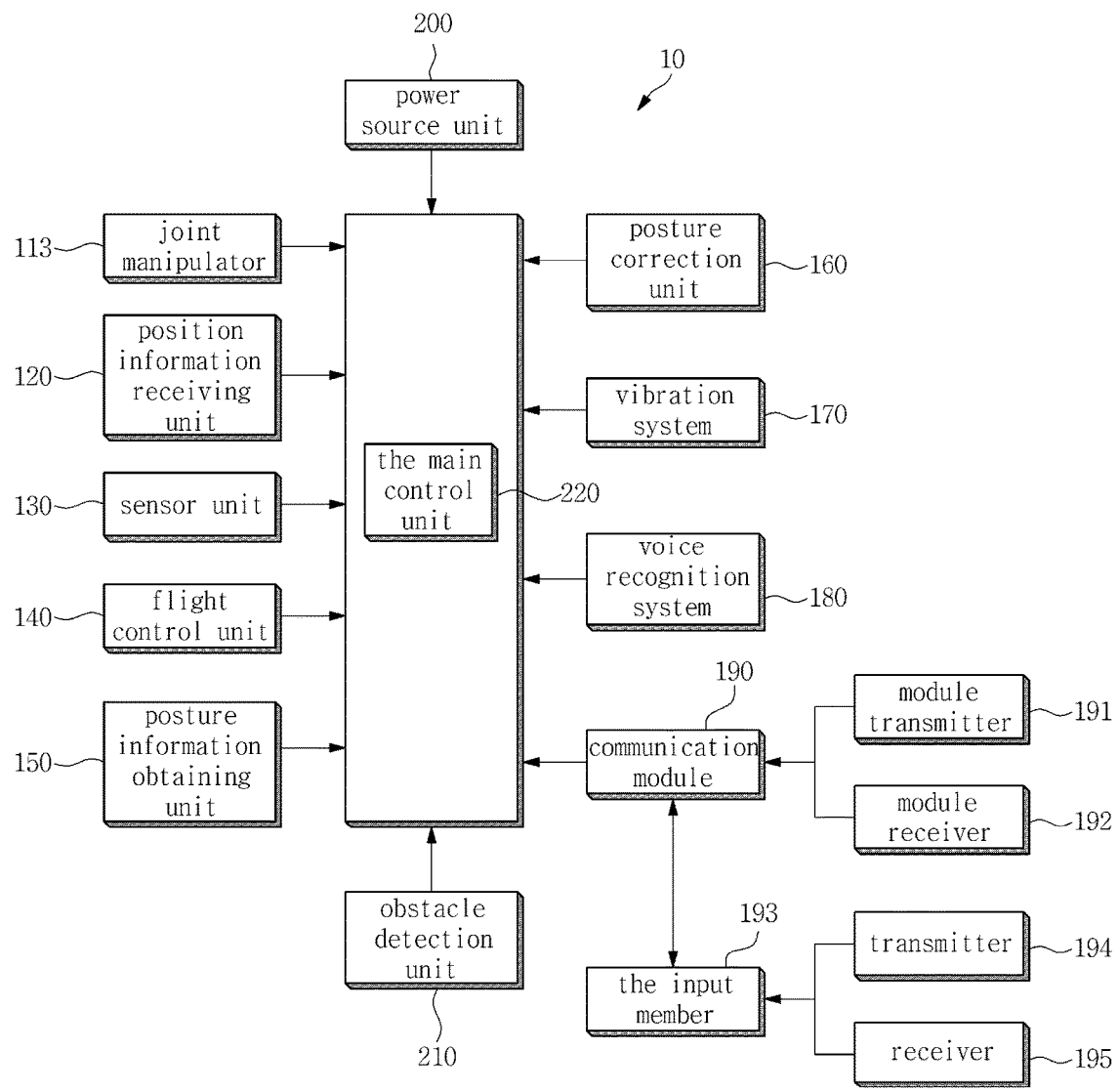
FIG. 1 is a block diagram schematically illustrating an exemplary embodiment of a display device according to the invention.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this invention will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
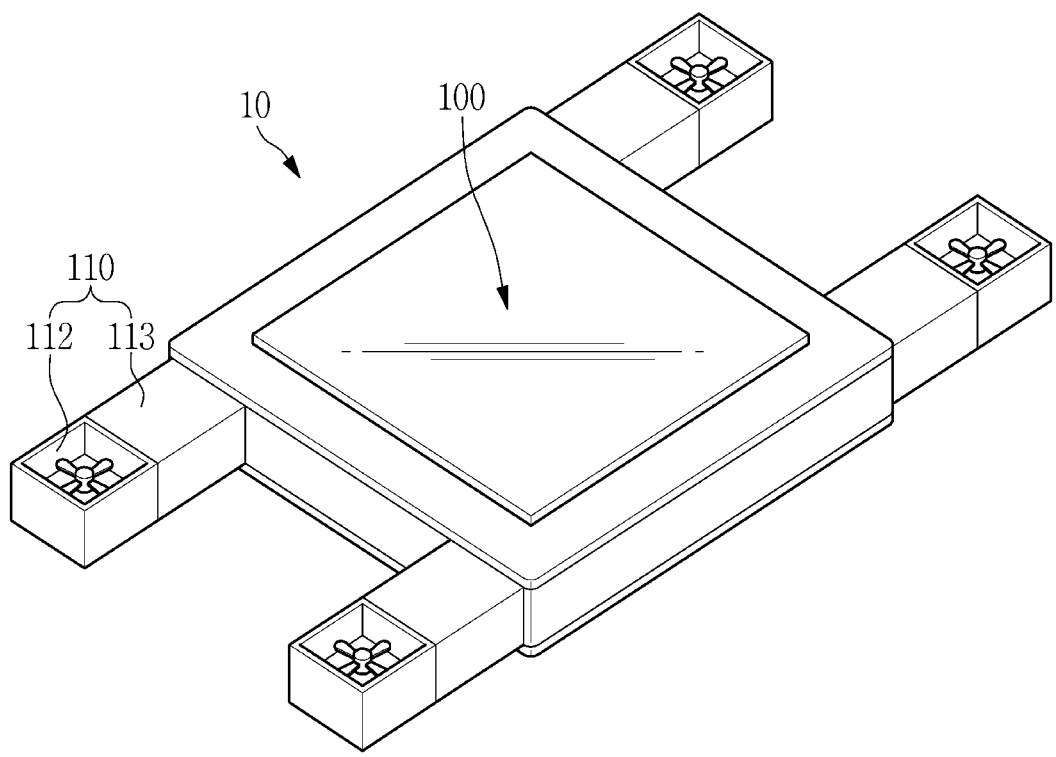
FIG. 2 is a perspective view illustrating an exemplary embodiment of a display device according to the invention.

FIG. 1 is a block diagram schematically illustrating a display device 10 according to an exemplary embodiment. FIG. 2 is a perspective view illustrating an exemplary embodiment of a display device 10 according to the invention.

Referring to FIGS. 1 and 2, the display device 10 may include a display unit 100, a flight unit 110, a position information receiving unit 120, a sensor unit 130, a flight control unit 140, a posture information obtaining unit 150, a posture correction unit 160, a vibration system 170, a voice recognition system 180, a communication module 190, a power source unit 200, an obstacle detection unit 210, and a main control unit 220.

The display unit 100 may include a communication function. In an exemplary embodiment, the display unit 100 may include at least one of the various types of display devices such as a smart phone, a tablet personal computer ("PC"), a mobile phone, a video telephone, an electronic book (e-book) reader, a desktop PC, a laptop PC, a netbook computer, a personal digital assistant ("PDA"), a portable multimedia player ("PMP"), an MPEG-1 or MPEG-2 audio layer III ("MP3") player, a mobile medical device, a camera, and a wearable device such as a head-mounted device ("HMD"), for example, electronic glasses, an electronic garment, an electronic bracelet, an electronic necklace, electronic accessories, an electronic tattoo, or a smart watch.

When the display unit 100 is provided as a television ("TV"), the display unit 100 may include an image receiver and an image processor. The image receiver may wirelessly receive a radio frequency ("RF") signal transmitted from a broadcasting station (not illustrated), or may receive, in a wired manner, an image signal in accordance with standards such as a composite video, a component video, a super video, radio and television receiver manufacturers' association ("SCART"), and a high definition multimedia interface ("HDMI"). In a case in which an image signal is a broadcasting signal, the image receiver may include a tuner which performs tuning on the broadcasting signal for each channel.

The image processor may perform various predetermined image processing processes on an image signal. The image processor may perform the various image processing processes to output the image signal to the display unit 100, to thereby display an image on the display unit 100.

Figure 4:
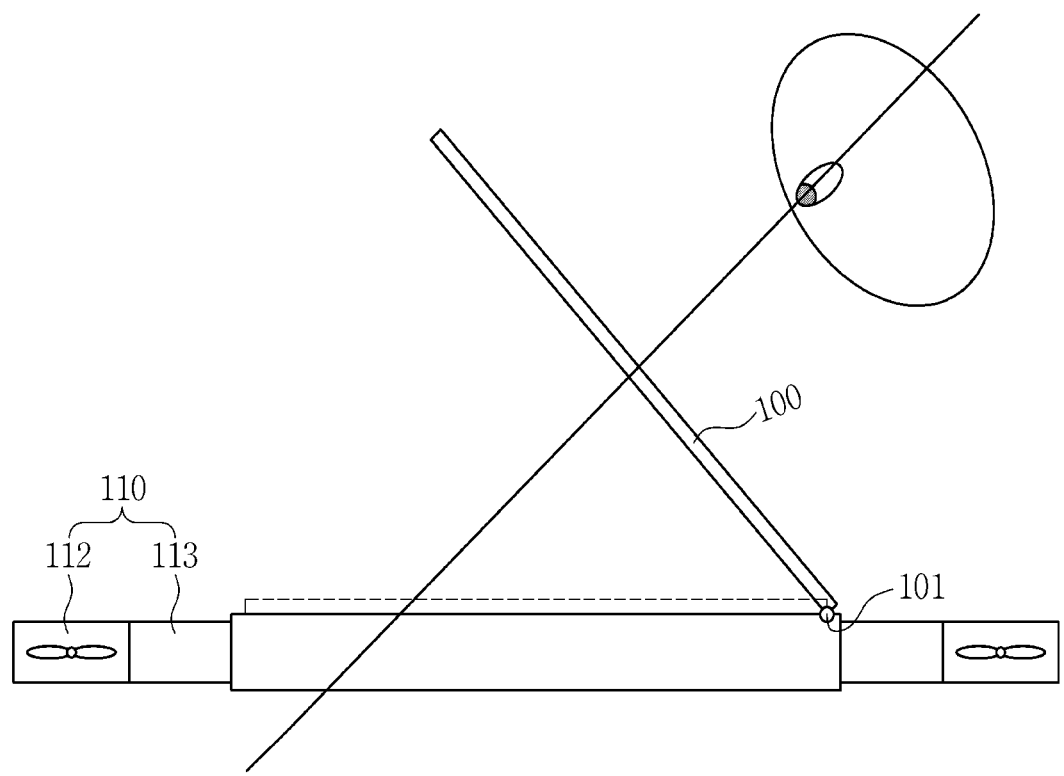
FIG. 4 is a side view illustrating another exemplary embodiment of a display device according to the invention.

The display unit 100 may be connected to the display device 10 through a connector 101 (refer to FIG. 4). An angle of the connector 101 may vary by the posture correction unit 160 which is to be described further below.

Referring to FIG. 2, the flight unit 110 may include a motor (not illustrated), a propeller 112, a joint manipulator 113, and a servomechanism (not illustrated). The motor (not illustrated) may employ a commonly used brushless direct current ("BLDC") motor which is driven by a direct current ("DC") voltage. The propeller 112 may use a propeller applied to a general flying object. The flight unit 110 may be coupled to the display unit 100 through the joint manipulator 113 to thereby change a thrust direction and an inclination angle of the display device 10.

The joint manipulator 113 may be connected to an end portion of the display unit 100. An inclination angle of the flight unit 110 may vary based on the joint manipulator 113. A space may be defined in the joint manipulator 113 to accommodate the propeller 112, and may rotate to allow the flight unit 110 to be positioned on a rear surface of the display device 10.

The inclination angle of the flight unit 110 may continuously vary based on a control by the main control unit 220. Accordingly, a lift force of the flight unit 110 may be promptly and minutely adjusted during the flight.

In addition, a wing shape of the flight unit 110 is not limited to a quad-rotor shape, and may include various shapes of rotors including a multi-rotor, a ferri-rotor, an opti-rotor, a rocket, and the like.

The position information receiving unit 120 may receive information on a current position of the display device 10 at predetermined times, upon an input of flight information being applied thereto.

In an exemplary embodiment, the position information receiving unit 120 may include a global positioning system ("GPS") receiver mounted in the display device 10, and may obtain the information on the current position of the display device 10 using the GPS receiver.

In an exemplary embodiment, the position information receiving unit 120 may include an inertial measurement unit ("IMU"), and may obtain the information on the current position of the display device 10 based on an initial position of the display device 10 using the IMU.

In an exemplary embodiment, the position information receiving unit 120 may include a Wi-Fi-based positioning system ("WPS"), and the WPS may receive information on a wireless access point ("WAP") input through Wi-Fi to thereby detect a position.

In an exemplary embodiment, the sensor unit 130 may include a camera and an observation system which reads a movement of a user and transmits information of the movement to the main control unit 220. The observation system may perform eye-tracking or head-tracking on a head movement of the user in real time, may calculate the tracked head movement of the user, may convert the calculated head movement into movement information to store the movement information, and may transmit the movement information to the main control unit 220.

The sensor unit 130 may be driven at the same resolution as that of the camera to recognize a face or a pupil of the user, and may transmit information on the recognized face or pupil to the main control unit 220. The sensor unit 130 may recognize a face or a pupil of the user. In other words, the sensor unit 130 may recognize a face angle of the user. In addition, the sensor unit 130 may recognize a gesture of the user through the camera. In an exemplary embodiment, the sensor unit 130 may recognize a finger movement or an arm movement by tracking the finger or arm movement, for example.

The flight control unit 140 may include a navigation sensor embedded in the display device 10, and the navigation sensor may automatically control a flight of the display device 10. In the illustrated exemplary embodiment, the navigation sensor may use a gyrocompass, a magnetic compass, and the like.

The flight control unit 140 may control a flight speed and a flight direction of the display device 10 based on a movement of a user through being connected to the main control unit 220 to receive corresponding movement information of the user by determining a distance between the display device 10 and the user and to control a signal applied to the display device 10 based on the corresponding movement information.

The posture information obtaining unit 150 may obtain information on a current posture of the display device 10. In an exemplary embodiment, the posture information obtaining unit 150 may obtain three-dimensional ("3D") posture information of the display device 10 with respect to the current posture of the display device 10, using at least one of a geomagnetic sensor, a gyro sensor, and an IMU, for example.

In a case of using the IMU, movements of a pitch axis, a roll axis, and a yaw axis may be verified.

Figure 3:
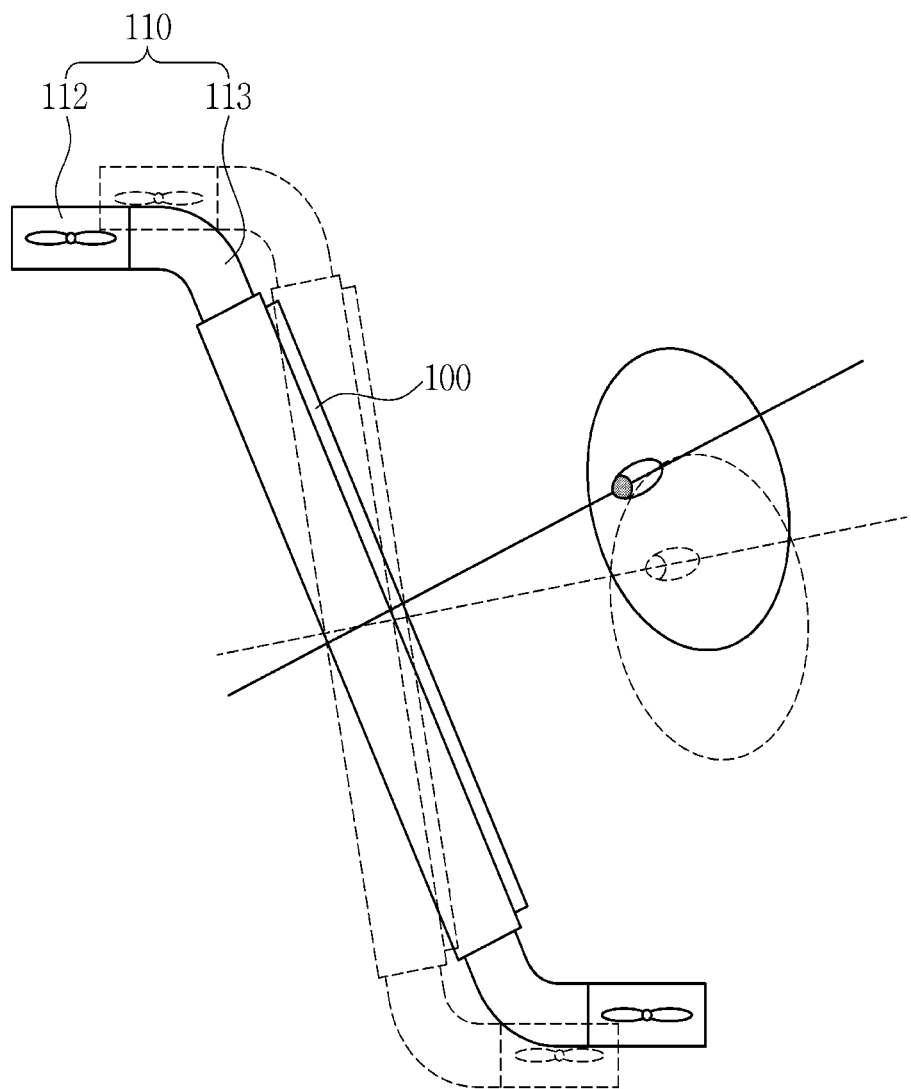
FIG. 3 is a side view illustrating an exemplary embodiment of a display device according to the invention.

FIG. 3 is a side view illustrating the display device 10 according to the exemplary embodiment.

Referring to FIGS. 1 and 3, the posture correction unit 160 may correct a posture of the display device 10 based on a result of comparing a current posture of the display device 10 and a reference posture. The posture of the display device 10 may include an angle of the display device 10.

In an exemplary embodiment, the posture correction unit 160 may correct the posture of the display device 10 using a gimbal, for example. In this instance, the posture correction unit 160 may use a posture of the display device 10 when the display device 10 is taking off as the reference posture.

The posture correction unit 160 may vary an angle of the display device 10 to match a reference angle of the display device 10 and a gaze angle of a user obtained from the sensor unit 130.

In an exemplary embodiment, the joint manipulator 113 may have a bent shape. In an exemplary embodiment, the bent shapes of the joint manipulators 113 may be opposite to each other with reference to the display unit 100.

FIG. 4 is a side view illustrating a display device 10 according to another exemplary embodiment.

Referring to FIGS. 1 and 4, a posture correction unit 160 may change an angle of a display unit 100. In an exemplary embodiment, a sensor unit 130 may change the angle of the display unit 100 by adjusting a connector 101 so as to match a reference angle of the display unit 100 and a gaze angle of a user obtained from the sensor unit 130, for example.

A vibration system 170 may reduce screen flickering caused by a flight vibration.

The vibration system 170 may be disposed within the display device 10. In an exemplary embodiment, the vibration system 170 may include a piezoelectric body (not illustrated), and a current applying member (not illustrated) connected to the piezoelectric body to apply a current thereto to allow the piezoelectric body to operate at a set level of resistance. In this instance, the current applying member may apply a current to the piezoelectric body through electric wires (not illustrated), and the piezoelectric body may operate at the level of resistance which is set when the current is applied.

In an exemplary embodiment, when resistance is applied to the piezoelectric body, elasticity of the piezoelectric body may vary such that vibrations generated by an external device such as an insulator (not illustrated) may be suppressed or curbed.

In other words, resistance applied to the piezoelectric body may be turned on/off to thereby vary elasticity of the vibration system 170. In an exemplary embodiment, the vibration system 170 may be connected to a component, for example, the insulator, to thereby vary elasticity of the vibration system 170 so as to suppress or curb vibrations.

In an exemplary embodiment, a voice recognition system 180 may use a microphone including a voice command recognition function for receiving an input of a voice command from a user, for example. In an exemplary embodiment, such a microphone used in the voice recognition system 180 may include a microphone directly receiving a general voice input and a microphone using vocal cords or a nasal cavity, for example. The voice command which is input through the voice recognition system 180 may be transmitted to a main control unit 220.

A communication module 190 may include a module transmitter 191 and a module receiver 192, and may wirelessly transceive data to and/or from an input member 193 by performing wireless communication. Although the illustrated exemplary embodiment illustrates an example of two information processors 191 and 192 intercommunicating with one another, it is only given by way of example and the scope of the invention is not limited thereto. In another exemplary embodiment, more than two information processors may be included.

According to exemplary embodiments, three or more information processors may perform wireless communication based on a multicast scheme, in addition to the aforementioned case in which the two information processors 191 and 192 perform wireless intercommunication based on a unicast scheme.

The information processors 191 and 192 according to the illustrated exemplary embodiment may be divided into a module transmitter 191 transmitting data and a module receiver 192 receiving data from the module transmitter 191. However, such a divided role may be assigned based on data transception, as a matter of convenience only.

Essentially, the information processors 191 and 192 may include a wireless communication module or a wireless communication interface (not illustrated) for wireless communication and a processor (not illustrated) for processing data and for controlling the information processors 191 and 192. Since such a configuration of the information processors 191 and 192 is well known in the pertinent art, a detailed description thereof will be omitted.

The input member 193 may include a transmitter 194 and a receiver 195. In the illustrated exemplary embodiment, the input member 193 may include a smart terminal, for example. The smart terminal may be wirelessly connected to the communication module 190 of the display device 10 through the transmitter 194 and the receiver 195.

In an exemplary embodiment, the smart terminal may have a well-known Bluetooth communication module, for example.

The input member 193 is not limited to the smart terminal and may also include a wireless input member such as a remote controller, and the like.

In an exemplary embodiment, the input member 193 may have a wearable shape so as to be worn by a user, for example.

A power source unit 200 may have an energy source built therein to supply a driving power. In an exemplary embodiment, the power source unit 200 may have a fuel cell or a rechargeable battery built therein as the energy source, for example.

An obstacle detection unit 210 may include a camera (not illustrated) and a sensor (not illustrated). The camera may be disposed at a side of the display device 10 and image data displayed through the camera may be transmitted to the main control unit 220, such that control data may be output from the main control unit 220.

The main control unit 220 may control an overall operation of respective components constituting the display device 10.

The main control unit 220 may allow the display device 10 to remain in a hovering state, which is a stationary flight, over a predetermined period of time. In the illustrated exemplary embodiment, in a case in which an angle of the display device 10 varies to correspond to a gaze angle of a user, rotational forces of propellers of respective flight units 110 may be differentiated from one another to achieve balance therebetween. In detail, the main control unit 220 may allow a rotational force of a propeller of a flight unit 110 adjacent to a ground surface to be slower than a rotational force of a propeller of a flight unit 110 remote from the ground surface.

Referring to FIG. 3, the main control unit 220 may allow the display device 10 to remain in a hovering state by adjusting the joint manipulator 113 when an angle of the display device 10 varies.

As set forth above, according to one or more exemplary embodiments, the display device may change an angle of the display device or the display unit based on a gaze of a user while moving along with the user by automatically tracking the user even in an inappropriate circumstance for the user to use a hand.

From the foregoing, it will be appreciated that various embodiments in accordance with the invention have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:
1. A display device comprising:
   a display unit;
   a plurality of flight units connected to the display unit and includes a propeller which changes a thrust direction and an inclination angle of the display unit;

a position information receiving unit which obtains information on a current position of the display device;
a sensor unit which obtains user information;
a flight control unit which automatically controls a flight speed and a flight direction of the display device;
a posture information obtaining unit which obtains posture information of the display device;
a main control unit which controls an overall operation of respective components of the display device; and
a posture correction unit which varies an angle of posture of the display device or the display unit relative to a user,
wherein each of the plurality of flight units further comprises a joint manipulator connected to one of opposite end portions of the display unit, and
wherein
a space is defined in the joint manipulator, and the propeller is disposed in the space.

2. The display device of claim 1, further comprising a vibration system.

3. The display device of claim 2, further comprising a voice recognition unit which recognizes a voice of the user and providing information on the recognized voice to the main control unit.

4. The display device of claim 3, further comprising a communication module receiving input information and providing the received input information to the main control unit.

5. The display device of claim 4, further comprising an input member transmitting input information to the communication module.

6. The display device of claim 5, further comprising a power source unit.

7. The display device of claim 6, further comprising an obstacle detection unit.

8. The display device of claim 1, wherein the posture information obtaining unit includes at least one of a gyro sensor, a motion sensor, and an accelerometer sensor.

9. The display device of claim 8, further comprising a connector connecting the display unit and the display device.

10. The display device of claim 8, wherein the position information receiving unit includes a global positioning system ("GPS") receiver.

11. The display device of claim 8, wherein the position information receiving unit includes an inertial measurement unit ("IMU").

12. The display device of claim 8, wherein the position information receiving unit includes a Wi-Fi-based positioning system ("WPS").

13. The display device of claim 8, wherein the input member is a smart device.

14. The display device of claim 1, wherein the user information includes position information of the user.

15. The display device of claim 1, wherein the user information includes face information of the user.

16. The display device of claim 1, wherein the user information includes pupil information of the user.

17. The display device of claim 1, wherein the user information includes gesture information of the user.

18. The display device of claim 1, wherein at least two of the plurality of flight units comprising the joint manipulator are disposed with the display unit interposed therebetween.

* * * * *